United States Patent
Taniguchi

(10) Patent No.: US 10,527,919 B2
(45) Date of Patent: Jan. 7, 2020

(54) DISPLAY DEVICE

(71) Applicant: Panasonic Intellectual Property Management Co., Ltd., Osaka (JP)

(72) Inventor: Koji Taniguchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 44 days.

(21) Appl. No.: 15/987,658

(22) Filed: May 23, 2018

(65) Prior Publication Data
US 2018/0348619 A1 Dec. 6, 2018

(30) Foreign Application Priority Data
May 31, 2017 (JP) .................................. 2017-108166

(51) Int. Cl.
*G03B 21/28* (2006.01)
*G02B 27/01* (2006.01)
*G03B 21/00* (2006.01)

(52) U.S. Cl.
CPC ......... *G03B 21/28* (2013.01); *G02B 27/0101* (2013.01); *G03B 21/006* (2013.01)

(58) Field of Classification Search
CPC .............................. G03B 21/28; G02B 27/0101
USPC ............................. 359/631, 632, 869; 353/98
See application file for complete search history.

(56) References Cited

U.S. PATENT DOCUMENTS

| 1,466,410 | A | * | 8/1923 | Pascucci | F21V 7/04 |
| | | | | | 362/308 |
| 3,839,632 | A | * | 10/1974 | Federico | F21V 7/16 |
| | | | | | 362/278 |
| 4,837,551 | A | * | 6/1989 | Iino | G01P 1/08 |
| | | | | | 340/461 |
| 5,788,355 | A | * | 8/1998 | Na | G03B 5/04 |
| | | | | | 353/101 |
| 10,001,646 | B2 | * | 6/2018 | Ando | G02B 27/01 |
| 2009/0027589 | A1 | * | 1/2009 | Yamazoe | G02B 27/0101 |
| | | | | | 349/62 |
| 2013/0201540 | A1 | * | 8/2013 | Sasaki | G02B 27/0149 |
| | | | | | 359/221.3 |

(Continued)

FOREIGN PATENT DOCUMENTS

JP 2011-150099 8/2011

*Primary Examiner* — Ricky D Shafer
(74) *Attorney, Agent, or Firm* — Greenblum & Bernstein, P.L.C.

(57) ABSTRACT

A display device has a housing, a video generator, and a mirror. The mirror has a mirror body and a supported portion. The mirror body has a plate shape. The supported portion is provided at at least one end portion in a first direction of the mirror body, and is supported by the housing to be rotatable around a rotating axis along the first direction. The mirror body has a first portion and a second portion. The first portion is located at a position overlapping the supported portion in a second direction crossing a thickness direction and the first direction of the mirror body. The second portion is located at a position different from the supported portion in the second direction. Rigidity per unit width of the first portion in the second direction is greater than rigidity per unit width of the second portion in the second direction.

7 Claims, 11 Drawing Sheets

(56) References Cited

U.S. PATENT DOCUMENTS

2014/0253821 A1\* 9/2014 Takatoh ................. B60K 35/00
349/11
2015/0022898 A1\* 1/2015 Yamakawa ............ B60K 35/00
359/633

\* cited by examiner

DISPLAY DEVICE

The present application claims the benefit of foreign priority of Japanese patent application 2017-108166 filed on May 31, 2017, the contents all of which are incorporated herein by reference.

BACKGROUND

1. Technical Field

The present disclosure relates to a display device having a mirror capable of changing an angle inside a housing.

2. Description of the Related Art

Unexamined Japanese Patent Publication No. 2011-150099 discloses a display device using a mirror unit having a reflecting mirror configured to reflect display light. The mirror unit has a configuration in which a shaft portion rotatably supported by a housing is formed integrally with a base material of the reflecting mirror.

SUMMARY

The present disclosure provides a display device capable of sufficiently assuring rigidity of a mirror.

A display device according to one aspect of the present disclosure has a housing, a video generator, and a mirror. The video generator projects a video. The mirror is provided inside the housing, reflects the video projected from the video generator, and projects the reflected video to an outside of the housing. The mirror has a mirror body and a supported portion. The mirror body has a plate shape, and has a reflecting surface. The supported portion is provided at at least one end portion in a first direction of the mirror body, and is supported by the housing to be rotatable around a rotating axis along the first direction. The mirror body has a first portion and a second portion. The first portion is located at a position overlapping the supported portion in a second direction crossing a thickness direction and the first direction of the mirror body. The second portion is located at a position different from the supported portion in the second direction. Rigidity per unit width of the first portion in the second direction is greater than rigidity per unit width of the second portion in the second direction.

A display device of the present disclosure can sufficiently assure rigidity of a mirror.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1:
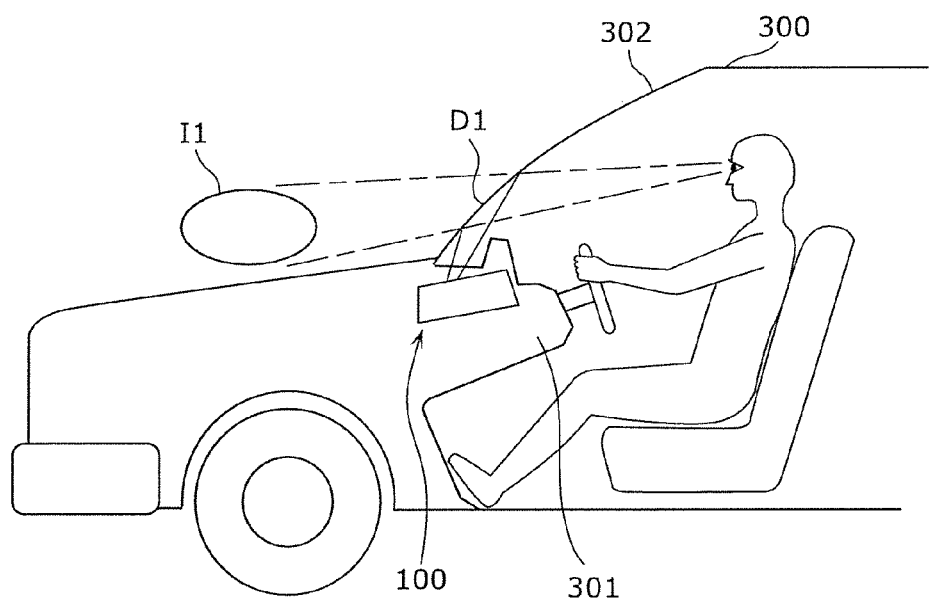
FIG. 1 is a view illustrating a usage example of a display device according to an exemplary embodiment.

DETAILED DESCRIPTION (Knowledge Underlying the Present Disclosure)

Prior to describing an exemplary embodiment of the present disclosure, problems found in conventional techniques will be briefly described herein.

In a display device in Unexamined Japanese Patent Publication No. 2011-150099, in place of a configuration in which a mirror unit is held by a holding member having a shaft portion, the mirror unit is formed integrally with the shaft portion. Accordingly, the rigidity of the mirror unit cannot be sufficiently assured. Specifically, since a thickness of the mirror unit of the display device is uniform, the mirror unit is easily bent by vibration in a state where a back surface of the mirror unit is not held by the holding member or the like. While increasing the thickness of the mirror unit to assure the rigidity of the mirror unit can be considered, when the thickness is simply increased, a material used to manufacture the mirror unit is increased, and a weight is also increased.

From the foregoing, there has been demanded a display device capable of sufficiently assuring rigidity of a mirror while suppressing an increase in weight as much as possible.

Consequently, a display device according to one aspect of the present disclosure has a housing, a video generator, and a mirror. The video generator projects a video. The mirror is provided inside the housing, reflects the video projected from the video generator, and projects the reflected video to the outside of the housing. The mirror has a mirror body and a supported portion. The mirror body has a plate shape, and has a reflecting surface. The supported portion is provided at at least one end portion in a first direction of the mirror body, and is supported by the housing to be rotatable around a rotating axis along the first direction. The mirror body has a first portion and a second portion. The first portion is located at a position overlapping the supported portion in a second direction crossing a thickness direction and the first direction of the mirror body. The second portion is located at a position different from the supported portion in the second direction. Rigidity per unit width of the first portion in the second direction is greater than rigidity per unit width of the second portion in the second direction.

With the foregoing configuration, the rigidity per unit width in the second direction of the first portion located at the position overlapping the supported portion of the mirror body is greater than the rigidity per unit width in the second direction of the second portion located at the position different from the supported portion, so that the rigidity near the supported portion can be assured. Thus, a number of parts can be reduced, and the rigidity of the mirror can also be sufficiently assured.

Moreover, the first portion and the second portion may be portions formed entirely in the first direction of the mirror body.

This can sufficiently assure the rigidity of a portion between the supported portion and the mirror body. That is, the configuration can be obtained in which the portion between the supported portion and the mirror body is hardly bent. Thus, a harmful effect due to vibration can be effectively reduced.

Moreover, the second portion may be located at both ends in the second direction of the mirror body.

This can increase an area of the second portion having the smaller rigidity. Thus, a mirror that has as small a weight as possible and a large reflecting surface, and sufficiently assures rigidity can be realized.

Moreover, a thickness in the first portion of the mirror body may be larger than a thickness in the second portion.

This can prevent a weight of the mirror body from increasing as much as possible, and assure the rigidity near the supported portion.

Moreover, the reflecting surface may be concave in a substantially entire part of the reflecting surface, a surface on an opposite side of the mirror body from the reflecting surface may be convex in a substantially entire part of the surface, and a curvature of the reflecting surface may be smaller than a curvature of the surface on the opposite side.

This can prevent the weight of the mirror body from increasing as much as possible, and assure the rigidity near the supported portion, even when the mirror is a concave mirror.

Moreover, the first portion may have a rib projecting on an opposite side of the mirror body in respect to the reflecting surface and extending in a projecting line in the first direction.

This can prevent the weight of the mirror body from increasing as much as possible, and assure the rigidity near the supported portion with the simple configuration.

Moreover, a material of the first portion may have rigidity greater than a material of the second portion.

This can assure the rigidity near the supported portion only by changing the material without varying the thickness.

Hereinafter, an exemplary embodiment will specifically be described with reference to the drawings. Note that the exemplary embodiment described below illustrates a specific example of the present disclosure. Numerical values, shapes, materials, structural elements, disposition positions and connection modes of the structural elements, steps, order of the steps, and the like illustrated in the following exemplary embodiment are merely examples, and therefore are not intended to limit the present disclosure. Furthermore, among the structural elements in the following exemplary embodiment, the structural elements not recited in the independent claim indicating the broadest concept are described as optional structural elements.

Exemplary Embodiment

[1. Usage Example of Display Device]

Figure 2:
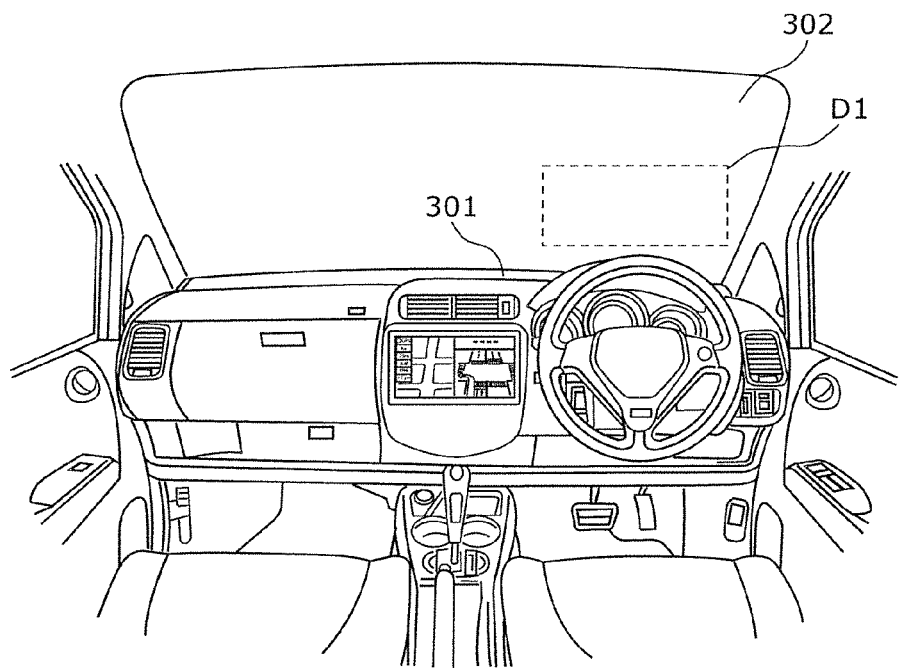
FIG. 2 is a view illustrating an area of an image displayed by the display device according to the exemplary embodiment.

With reference to FIGS. 1 and 2, a usage example and a schematic configuration of display device 100 according to the present exemplary embodiment will be described first. FIG. 1 is a view illustrating a usage example of a display device according to the present exemplary embodiment. FIG. 2 is a view illustrating a display area of an image displayed by the display device according to the present exemplary embodiment.

Display device 100 in the present exemplary embodiment is configured as a head-up display (HUD) for a vehicle, and is mounted around an upper surface of dashboard 301 of vehicle 300.

Display device 100 irradiates region D1 on windshield (front glass) 302 with light. This windshield 302 serves as a display medium. The projected light is reflected at windshield 302. This reflected light is directed to an eye of a driver sitting on a driver seat, who is a user of display device 100. When the reflected light enters the eye of the driver, the driver recognizes this light as virtual image I1 in front of actual objects that can be viewed through windshield 302. This virtual image I1 seems to be present on the opposite side of windshield 302 (outside the vehicle). In this exemplary embodiment, this series of processes will be expressed below as "display device 100 displays virtual image I1 by using windshield 302".

FIG. 2 is a view of an example of region D1 where the light is projected by display device 100 in the present exemplary embodiment.

As illustrated in FIG. 2, display device 100 mounted on dashboard 301 projects the light, for example, to region D1 located in a lower portion of windshield 302 on a side of the driver seat (a region surrounded by a broken line in the figure). As a result, virtual image I1 is displayed so as to seem to be present on the opposite side of windshield 302 with respect to the driver sitting on the driver seat (outside the vehicle) (refer to FIG. 1).

[2. Configuration of Display Device]

Figure 3:
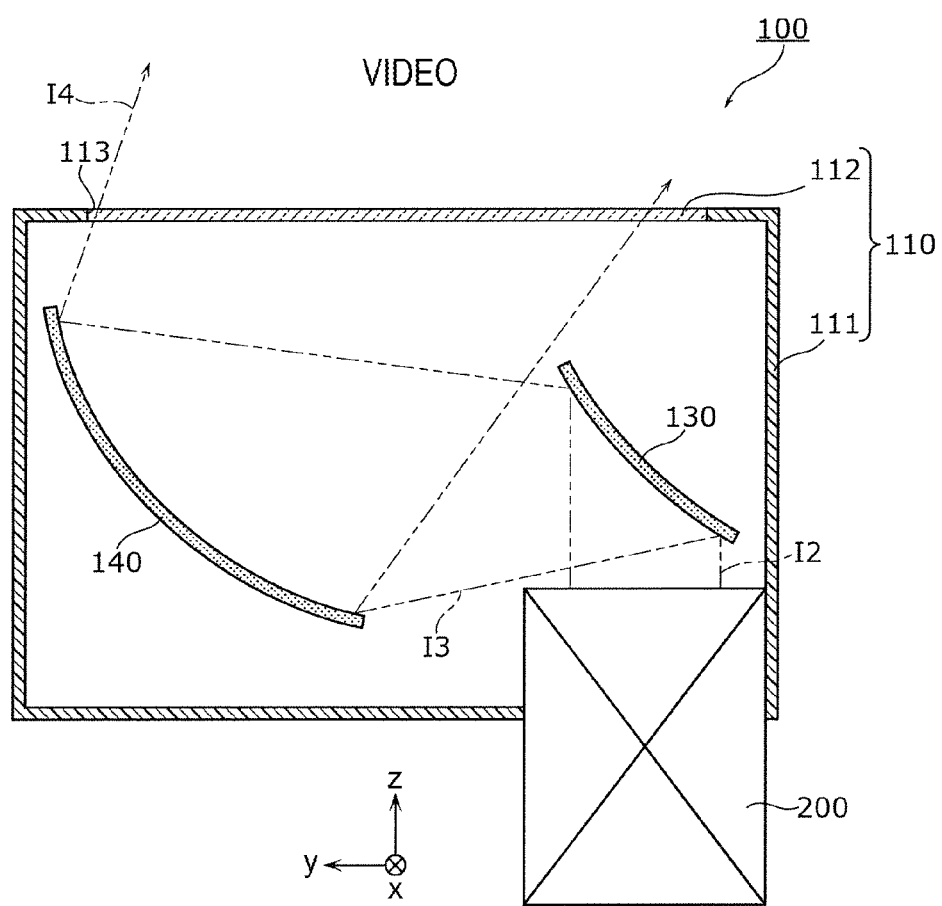
FIG. 3 is a schematic cross-sectional view illustrating a configuration of the display device according to the exemplary embodiment.
Figure 4:
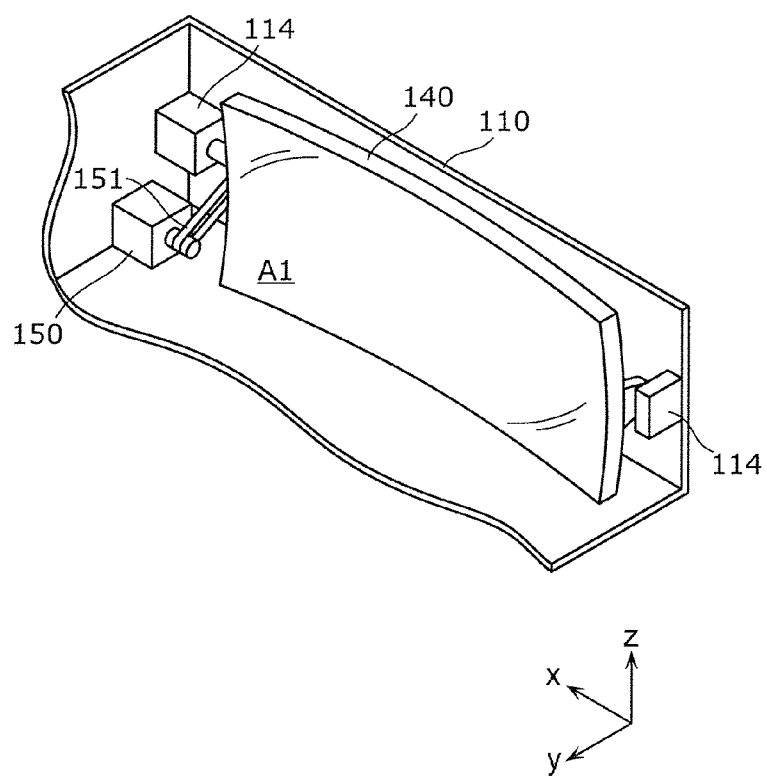
FIG. 4 is a perspective view illustrating a part of an inside of a housing of the display device according to the exemplary embodiment.

Next, with reference to FIGS. 3 and 4, a configuration of display device 100 according to the present exemplary embodiment will be described. FIG. 3 is a schematic cross-sectional view illustrating the configuration of the display device according to the present exemplary embodiment. FIG. 4 is a perspective view illustrating a configuration around a mirror inside the housing of the display device according to the exemplary embodiment. Note that, in description of FIG. 3, a z-axis direction denotes a travelling direction of light emitted by a light source included in liquid crystal module 200, an x-axis direction denotes a direction perpendicular to the z-axis direction, and a y-axis direction denotes a direction perpendicular to the z-axis direction and the x-axis direction. Further, the x-axis direction corresponds to a lateral direction (horizontal direction) of an image formed by a liquid crystal panel included in liquid crystal module 200, and the y-axis direction corresponds to a longitudinal direction (vertical direction) of the image formed by the liquid crystal panel included in liquid crystal module 200. Moreover, in description of mirror 130 in FIG. 4 or later, the x-axis direction denotes a longitudinal direction of mirror 130, the z-axis direction denotes a short direction of mirror 130, and the y-axis direction denotes a thickness direction of mirror 130.

As illustrated in FIGS. 3 and 4, display device 100 includes housing 110, mirror 130, mirror 140, and liquid crystal module 200. Display device 100 may further have actuator 150.

As illustrated in FIG. 3, housing 110 has box-shaped housing body 111 formed with opening 113 on an upper side, and having a long rectangular parallelepiped shape in the x-axis direction, and transparent cover 112 configured to close opening 113. Liquid crystal module 200 is mounted at a lower end of housing body 111. Housing 110 accommodates mirror 130, mirror 140, actuator 150, and a part of liquid crystal module 200. Housing 110 is made of, for example, resin, metal or the like.

Mirror 130 reflects video 12 projected by liquid crystal module 200. Mirror 140 reflects video 13, which is formed by reflection of video 12 by mirror 130, and projects reflected video 14 to the outside of display device 100 through opening 113. Specifically, video 14 is projected on windshield 302. As illustrated in FIG. 4, in the present exemplary embodiment, mirror 130 and mirror 140 are members each having a long rectangular plate shape in the x-axis direction. Mirrors 130, 140 are made of, for example, resin, metal or the like.

Both ends in the x-axis direction of mirror 140 are supported rotatably around a rotating axis parallel to the x-axis direction by supporters 114 provided in housing body 111. Moreover, mirror 140 is formed with reflecting surface A1 in a surface on a y-axis positive side. Supporters 114 may be configured so as to be formed integrally with housing body 111, or may be configured by fixing other members as supporters 114 to housing body 111.

Actuator 150 is, for example, a motor that gives mirror 140 a power to change an angle of mirror 140. A rotating axis of actuator 150 and a rotating axis of mirror 140 are connected by belt 151, and the power by actuator 150 is transmitted to mirror 140 through belt 151.

Liquid crystal module 200 is one example of a video generator that projects a video by irradiating the liquid crystal panel with light from the light source. While liquid crystal module 200 is configured so that a part thereof is accommodated in housing 110, a configuration may be employed in which all thereof is accommodated in housing 110, or a configuration may be employed in which liquid crystal module 200 is disposed outside housing 110.

[3. Configuration of Mirror]

While a specific configuration of mirror 140 will be described below, mirror 130 may also have a similar configuration.

Figure 5:
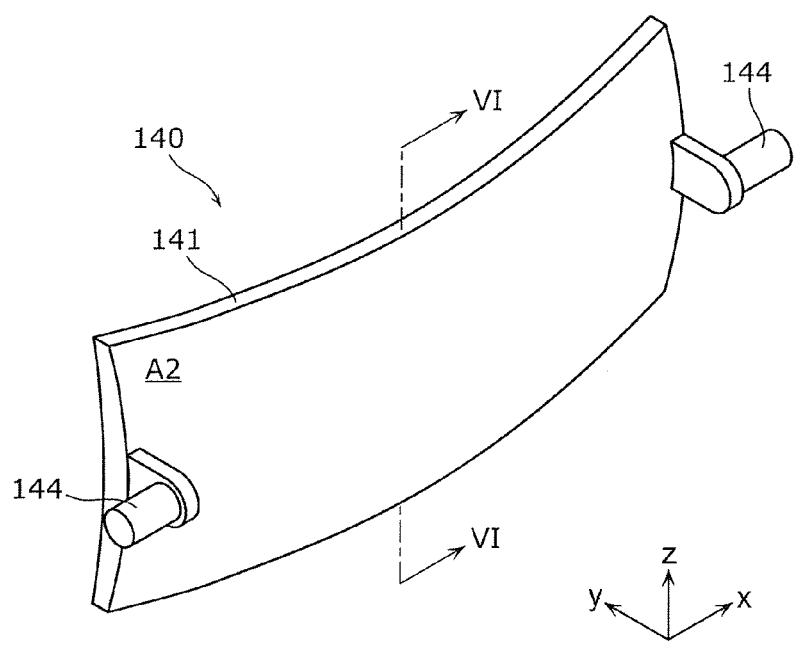
FIG. 5 is a perspective view when a mirror according to the exemplary embodiment is viewed from a back side.

FIG. 5 is a perspective view when the mirror according to the exemplary embodiment is viewed from a back side.

As illustrated in FIG. 5, mirror 140 has mirror body 141 and paired supported portions 144. Mirror body 141 is a site having a long rectangular plate shape in the x-axis direction. Moreover, mirror body 141 is formed with reflecting surface A1 in the surface on the y-axis positive side. In mirror body 141, reflecting surface A1 is a concave curved surface over substantially an entire surface, surface A2 on the opposite side to reflecting surface A1 is a convex curved surface over substantially an entire surface.

Paired supported portions 144 are sites provided at both ends in the x-axis direction (longitudinal direction) of mirror body 141, and supported by housing 110 rotatably around the rotating axis along the x-axis direction. Moreover, paired supported portions 144 are provided near a center in the short direction of mirror body 141. Specifically, paired supported portions 144 are sites projecting on a y-axis direction negative side in both end portions in the x-axis direction of mirror body 141, and columnar sites further projecting from the foregoing sites toward both outer sides in the x-axis direction. Paired supported portions 144 are each supported at a side surface of the columnar shape of the columnar site by supporter 114 of housing 110. Therefore, mirror body 141 can rotate with respect to housing 110 with a central axis of the columnar site of each of paired supported portions 144 serving as the rotating axis.

While supporters 114 each support the side surface of the columnar shape of each of paired supported portions 144, the present disclosure is not limited thereto. That is, the paired supported portions may be circular openings when viewed in the x-axis direction, and the supporters provided in the housing may be configured by projecting portions in internal contact with the circular openings as the paired supported portions.

Both paired supported portions 144 may not have a similar configuration, as long as mirror body 141 is supported rotatably around the rotating axis along the x-axis direction. Moreover, supported portions 144 may not be provided at both the end portions in the x-axis direction of mirror body 141, and may be provided in at least one of the end portions.

Here, a cross-section when mirror 140 is cut along a plane perpendicular to the x-axis direction will be described with reference to FIG. 6.

Figure 6:
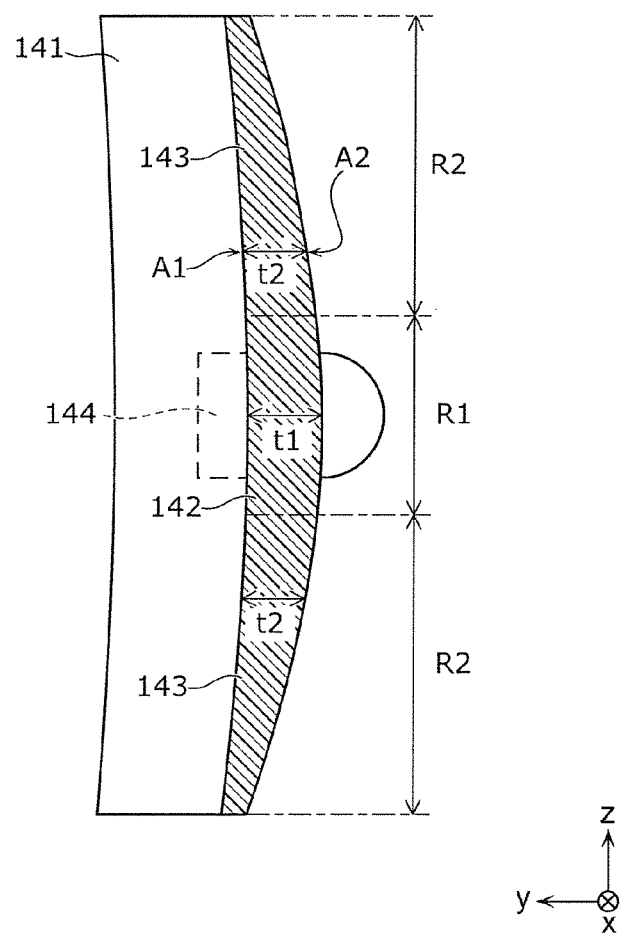
FIG. 6 is a cross-sectional view along VI-VI of the mirror in FIG. 5.

FIG. 6 is a cross-sectional view along VI-VI of the mirror in FIG. 5.

As illustrated in FIG. 6, mirror body 141 has first portion 142 and two second portions 143 in the short direction of mirror body 141. While in FIG. 6, a part of a cross-section of mirror body 141 is illustrated, an almost similar cross-sectional shape to the cross-sectional shape in FIG. 6 may be formed over an entire width in the x-axis direction of mirror body 141.

First portion 142 is a site located at a position overlapping paired supported portions 144 in the short direction. Specifically, first portion 142 is a site located in region R1 overlapping paired supported portions 144 of regions sectioned in the short direction of mirror body 141.

Second portions 143 are sites located at positions different from the position of paired supported portions 144 in the short direction. Specifically, second portions 143 are each a site located in region R2 not overlapping paired supported portions 144 of the regions sectioned in the short direction of mirror body 141. Two second portions 143 are located at both ends in the short direction of mirror body 141, because paired supported portions 144 are provided near the center in the short direction of mirror body 141.

Thickness t1 in first portion 142 is larger than thickness t2 of two second portions 143. Thereby, rigidity per unit width in the short direction of first portion 142 is larger than rigidity per unit width in the short direction of two second portions 143.

Moreover, a curvature of the curved surface of reflecting surface A1 of mirror body 141 may be smaller than a curvature of surface A2 on the opposite side to reflecting surface A1. Moreover, mirror body 141 may have a shape in which the thickness is largest in the center of the rotating axis of paired supported portions 144 and the thickness is monotonously reduced as mirror body 141 becomes away from the center in the short direction.

While region R1 is set as a region including all paired supported portions 144, the present disclosure is not limited thereto. Any region that overlaps paired supported portions 144 may be set as region R1. That is, any position of mirror body 141 that overlaps paired supported portions 144 in the short direction may be set as the first portion.

[4. Effects and the Like]

Display device 100 according to the present exemplary embodiment has housing 110, liquid crystal module 200, and mirror 140. At least a part of liquid crystal module 200 is provided inside housing 110 to project a video. Mirror 140 is provided inside housing 110, reflects video 12 projected from liquid crystal module 200, and projects reflected video 12 to the outside of housing 110. Mirror 140 has mirror body 141 and paired supported portions 144. Mirror body 141 is a plate-shaped site formed with reflecting surface A1. Paired supported portions 144 are provided at both the ends in the x-axis direction (longitudinal direction) of mirror body 141, and are supported by housing 110 rotatably around the rotating axis along the x-axis direction. In mirror body 141, the rigidity per unit width in the short direction of first portion 142 is larger than the rigidity per unit width in the short direction of second portions 143. First portion 142 is a portion of mirror body 141 located at the position overlapping paired supported portions 144 in the short direction crossing a thickness direction and the x-axis direction of mirror body 141. Second portions 143 are portions of mirror body 141 located at positions different from the position of paired supported portions 144 in the short direction.

With the foregoing configuration, the rigidity per unit width in the short direction of first portion 142 located at the position overlapping paired supported portions 144 of mirror body 141 is larger than the rigidity per unit width in the short direction of second portions 143 located at the positions different from paired supported portions 144, so that the rigidity near paired supported portions 144 can be assured. Thus, a number of parts can be reduced, and the rigidity of mirror 140 can also be sufficiently assured.

Moreover, in display device 100 according to the present exemplary embodiment, first portion 142 and second portions 143 are portions formed over the entire width in the x-axis direction of mirror body 141.

Thus, the rigidity of portions between paired supported portions 144 and mirror body 141 can be sufficiently assured. That is, the configuration can be obtained in which the portions between paired supported portions 144 and mirror body 141 are hardly bent. Thus, a harmful effect due to vibration can be effectively reduced.

Moreover, in display device 100 according to the present exemplary embodiment, second portions 143 are located at both the ends in the short direction of mirror body 141.

This can increase an area of second portions 143 having the small rigidity. Thus, mirror 140 that has as small a weight as possible and a large reflecting surface, and sufficiently assures rigidity can be realized.

Moreover, in display device 100 according to the present exemplary embodiment, thickness t1 in first portion 142 of mirror body 141 is larger than thickness t2 in second portions 143.

This can prevent the weight of mirror body 141 from increasing as much as possible, and assure the rigidity near paired supported portions 144.

Moreover, in display device 100 according to the present exemplary embodiment, reflecting surface A1 is a concave curved surface over substantially the entire surface. Surface A2 on the opposite side to reflecting surface A1 of mirror body 141 is a convex curved surface over substantially the entire surface. A curvature of reflecting surface A1 is smaller than a curvature of surface A2 on the opposite side.

This can prevent the weight of mirror body 141 from increasing as much as possible, and assure the rigidity near paired supported portions 144, even when mirror 140 is a concave mirror.

[5. Modifications]
[5-1. First Modification]

While in display device 100 according to the above-described exemplary embodiment, mirror body 141 of mirror 140 has the shape in which the thickness is the largest at the center of the rotating axis and is monotonously reduced as mirror body 141 becomes away from the center in the short direction, the present disclosure is not limited thereto, but a configuration in a first modification described below may be employed.

Mirror 140A according to the first modification will be described with reference to FIGS. 7 and 8.

Figure 7:
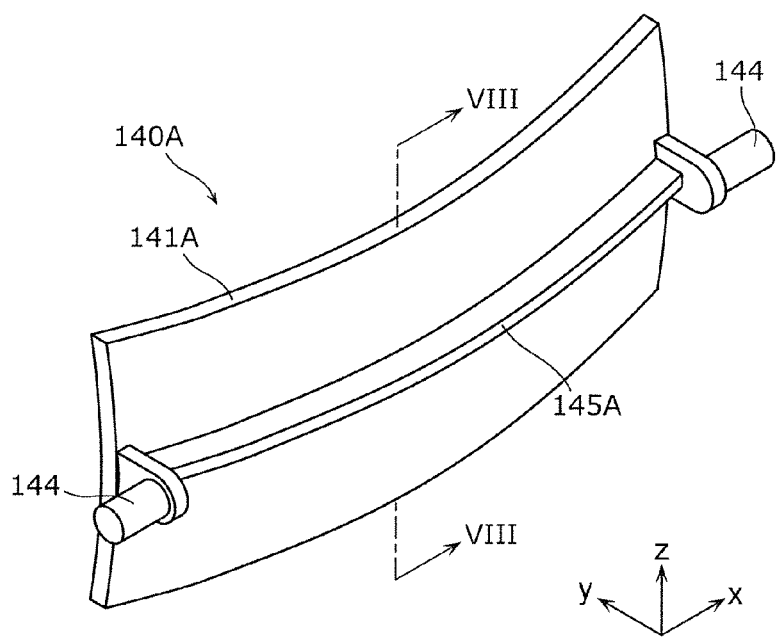
FIG. 7 is a perspective view when a mirror according to a first modification of the exemplary embodiment is viewed from a back side.

FIG. 7 is a perspective view when the mirror according to the first modification of the present exemplary embodiment is viewed from a back side. FIG. 8 is a cross-sectional view along VIII-VIII of the mirror in FIG. 7.

Figure 8:
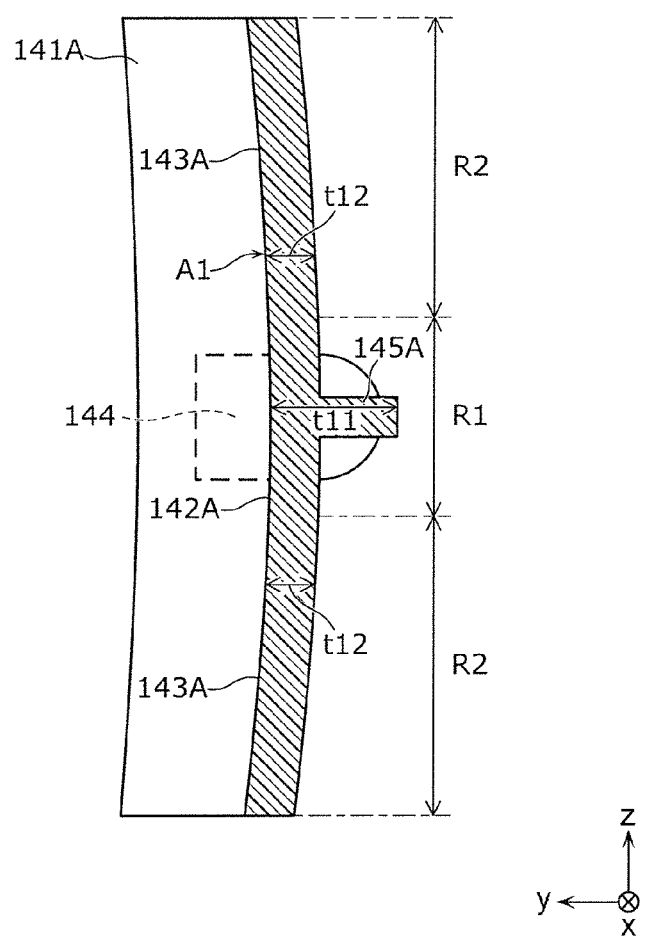
FIG. 8 is a cross-sectional view along VIII-VIII of the mirror in FIG. 7.

As illustrated in FIGS. 7 and 8, in mirror 140A, first portion 142A of mirror body 141A of mirror 140A has rib 145A projecting on the opposite side to reflecting surface A1 of mirror body 141A and extending in a projecting line in the x-axis direction (longitudinal direction). While in FIG. 8, a part of a cross-section of mirror body 141A is illustrated, an almost similar cross-sectional shape to the cross-sectional shape in FIG. 8 may be formed over an entire width in the x-axis direction of mirror body 141A.

Since in mirror 140A having the above-described configuration as well, thickness t11 of first portion 142A can be made larger than thickness t12 of second portions 143A, rigidity per unit width in a short direction of first portion 142A can be made larger than rigidity per unit width in the short direction of second portions 143A. That is, with the simple configuration, a weight of mirror body 141A can be prevented from increasing as much as possible, and the rigidity near paired supported portions 144 can be assured.

While rib 145A is a rib of one projecting line extending along the x-axis direction, the present disclosure is not limited thereto, but rib 145A may be configured of ribs of two or more projecting lines.

[5-2. Second Modification]

While in display device 100 according to the above-described exemplary embodiment, mirror body 141 of mirror 140 is configured such that thickness t1 of first portion 142 is larger than thickness t2 of second portions 143, the present disclosure is not limited thereto, but a configuration of a second modification described below may be employed.

Mirror 140B according to the second modification will be described with reference to FIGS. 9 and 10.

Figure 9:
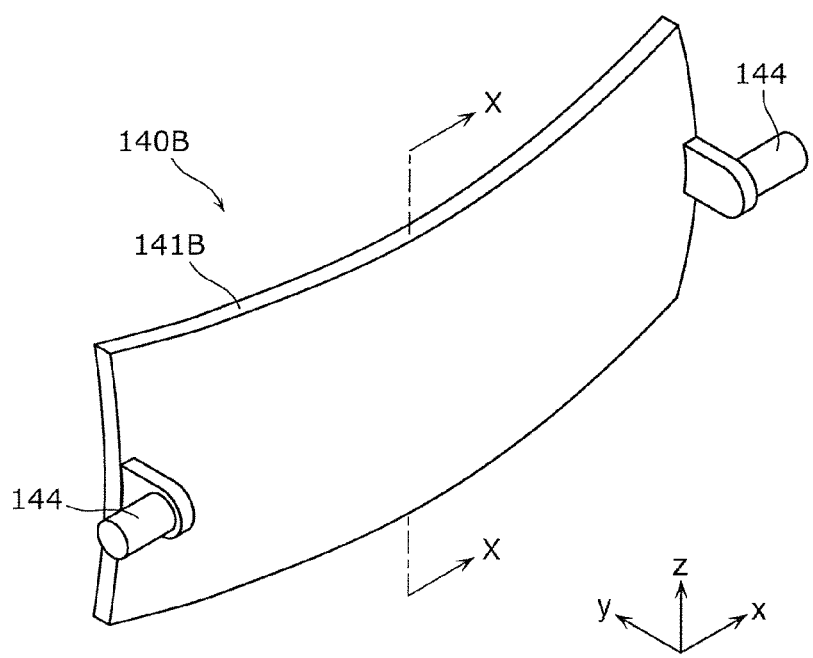
FIG. 9 is a perspective view when a mirror according to a second modification of the exemplary embodiment is viewed from a back side.

FIG. 9 is a perspective view when the mirror according to the second modification of the present exemplary embodiment is viewed from a back side. FIG. 10 is a cross-sectional view along X-X of the mirror in FIG. 9.

Figure 10:
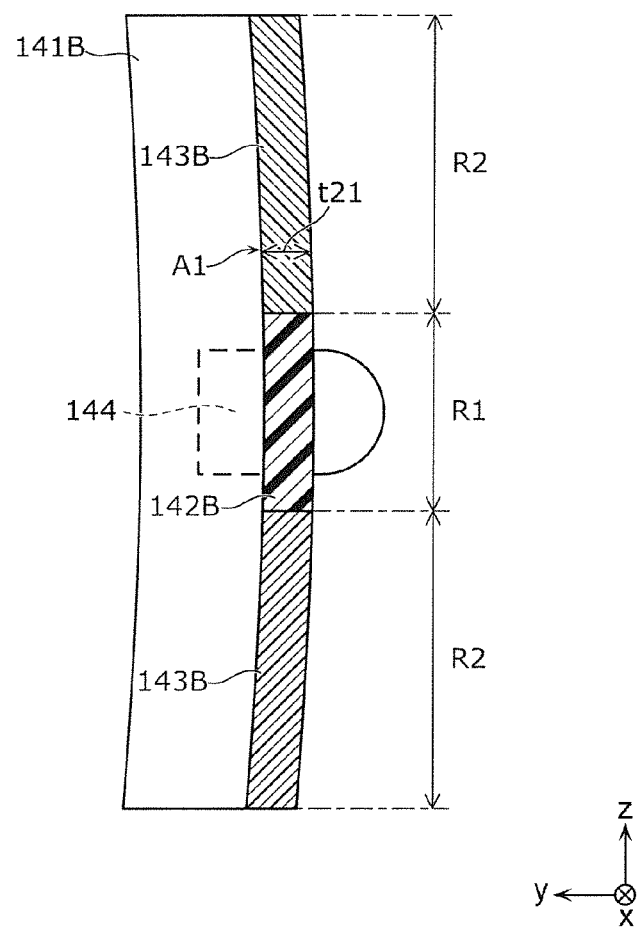
FIG. 10 is a cross-sectional view along X-X of the mirror in FIG. 9.

In mirror 140B, as illustrated in FIGS. 9 and 10, rigidity of a material of first portion 142B of mirror 140B is larger than rigidity of a material of second portions 143B. While in FIG. 10, a part of a cross-section of mirror body 141B is illustrated, an almost similar cross-sectional shape to the cross-sectional shape in FIG. 10 may be formed over an entire width in the x-axis direction of mirror body 141B.

For example, the material of first portion 142B is a resin obtained by adding an inorganic filler such as carbon fibers or glass fibers, and the material of second portions 143B is an additive-free resin, which brings about the configuration in which rigidity per unit width in a short direction of first portion 142B is larger than rigidity per unit width in the short direction of second portions 143B. Therefore, for example, as illustrated in FIG. 10, even if a thickness of first portion 142B and second portions 143B is set as uniform thickness t21, the rigidity per unit width in the short direction of first portion 142B can be made larger than the rigidity per unit width in the short direction of second portions 143B. Thus, a weight of mirror 140B can be made as small as possible, and moreover, a size can be made compact.

[5-3. Third Modification]

While in display device 100 according to the above-described exemplary embodiment, in mirror body 141 of mirror 140, the rigidity per unit width in the short direction of first portion 142 located at the position overlapping paired supported portions 144 is larger than the rigidity per unit width in the short direction of second portions 143 located at the positions different from paired supported portions 144, the present disclosure is not limited thereto. For example, a configuration of a third modification described below may be employed.

Mirror 140C according to the third modification will be described with reference to FIGS. 11 and 12.

Figure 11:
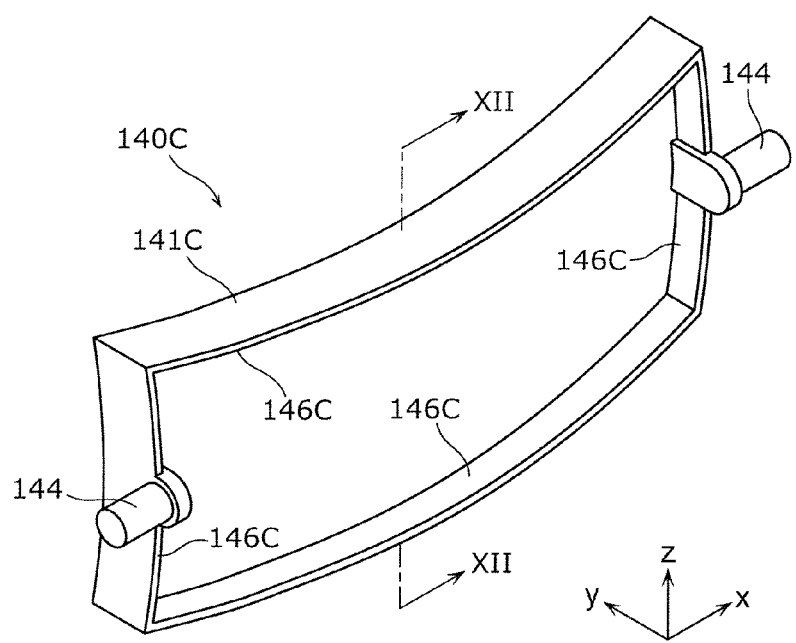
FIG. 11 is a perspective view when a mirror according to a third modification of the exemplary embodiment is viewed from a back side.

FIG. 11 is a perspective view when the mirror according to the third modification of the present exemplary embodiment is viewed from a back side. FIG. 12 is a cross-sectional view along XII-XII of the mirror in FIG. 11.

Figure 12:
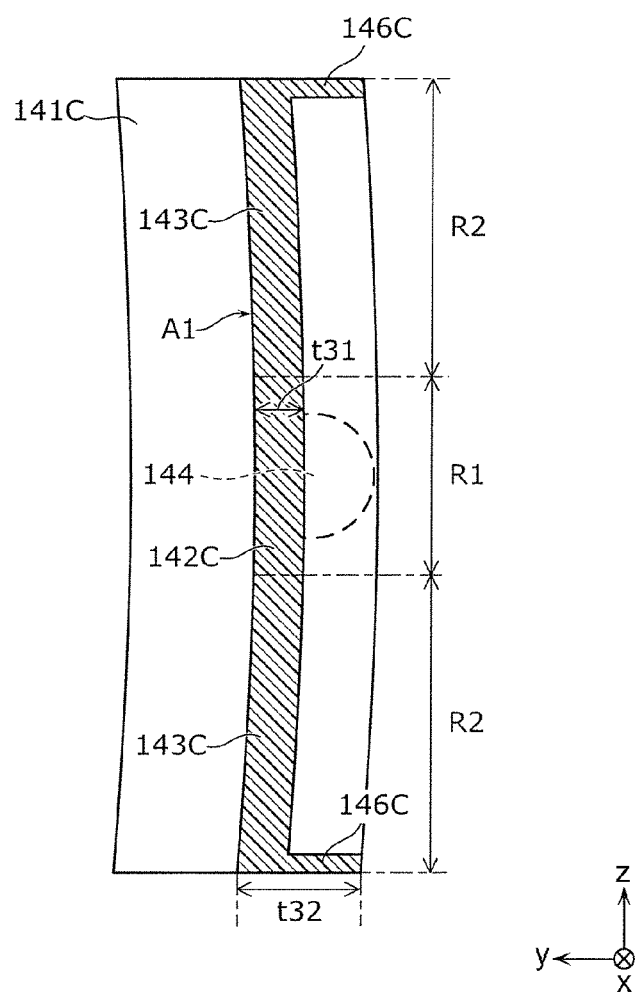
FIG. 12 is a cross-sectional view along XII-XII of the mirror in FIG. 11.

As illustrated FIGS. 11 and 12, mirror 140C has rib 146C projecting on the opposite side to a reflecting surface A1 side from an outer peripheral portion of mirror body 141C of mirror 140C. Rib 146C is, for example, an annular rib provided in the outer peripheral portion of mirror body 141C so as to surround mirror body 141C, as illustrated FIG. 11. Thus, since in mirror 140C, thickness t32 of second portions 143C of mirror body 141C is larger than thickness t31 of first portion 142C, rigidity per unit width in a short direction of second portions 143C is larger than rigidity per unit width in the short direction of first portion 142C. The above-described configuration can also effectively increase rigidity of whole mirror body 141C by providing rib 146C so as to surround mirror body 141C.

[5-4. Fourth Modification]

While in the above-described exemplary embodiment and the first to third modifications of the exemplary embodiment, paired supported portions 144 are provided at both the ends in the longitudinal direction of each of mirror bodies 141, 141A to 141C, the present disclosure is not limited thereto, but a configuration may be employed in which paired supported portions 144 are provided at both ends in the short direction of each of mirror bodies 141, 141A to 141C.

[5-5. Fifth Modification]

While in the above-described exemplary embodiment and the first to third modifications of the exemplary embodiment, mirrors 140, 140A to 140C are each a concave mirror, the mirror is not limited to the concave mirror, but may be a convex mirror. Alternatively, the present disclosure may be applied to a mirror formed in a flat plane.

While the display devices according to one or more aspects of the present disclosure have been described above based on the exemplary embodiment, the present disclosure is not limited to this exemplary embodiment. Configurations in which various variations conceived by those skilled in the art are applied to the present exemplary embodiment, and configurations established by combining components in different exemplary embodiments may also fall within the scope of one or more aspects of the present disclosure, without departing from the gist of the present disclosure.

The present disclosure is useful as a display device or the like capable of sufficiently assuring rigidity of a mirror.

What is claimed is:

1. A display device comprising:
   a housing;
   a video generator configured to project a video; and
   a mirror provided inside the housing, and configured to reflect the video projected from the video generator and to project the reflected video to an outside of the housing,
   wherein the mirror has:
      a plate-shaped mirror body having a reflecting surface; and
      a supported portion provided at at least one end portion in a first direction of the mirror body, and supported by the housing to be rotatable around a rotating axis along the first direction,
   the mirror body has a first portion located at a position overlapping the supported portion in a second direction crossing a thickness direction and the first direction of the mirror body, and a second portion located at a position different from the supported portion in the second direction, and
   rigidity per unit width of the first portion in the second direction is greater than rigidity per unit width of the second portion in the second direction.

2. The display device according to claim 1, wherein the first portion and the second portion are formed entirely in the first direction of the mirror body.

3. The display device according to claim 1, wherein the second portion is located at both ends in the second direction of the mirror body.

4. The display device according to claim 1, wherein a thickness in the first portion of the mirror body is larger than a thickness in the second portion.

5. The display device according to claim 1, wherein
   the reflecting surface is concave in a substantially entire part of the reflecting surface,
   a surface on an opposite side of the mirror body from the reflecting surface is convex in a substantially entire part of the surface, and
   a curvature of the reflecting surface is smaller than a curvature of the surface on the opposite side.

6. The display device according to claim 1, wherein the first portion has a rib projecting on an opposite side of the mirror body in respect to the reflecting surface and extending in a projecting line in the first direction.

7. The display device according to claim 1, wherein a material of the first portion has rigidity greater than rigidity of a material of the second portion.

* * * * *